(12) United States Patent
Zaragoza et al.

(10) Patent No.: US 7,096,208 B2
(45) Date of Patent: Aug. 22, 2006

(54) LARGE MARGIN PERCEPTRONS FOR DOCUMENT CATEGORIZATION

(75) Inventors: Hugo Zaragoza, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 10/167,524

(22) Filed: Jun. 10, 2002

(65) Prior Publication Data

US 2003/0229604 A1    Dec. 11, 2003

(51) Int. Cl.
*G06F 15/18* (2006.01)

(52) U.S. Cl. .............................. 706/16; 706/20; 706/25
(58) Field of Classification Search .................... 706/16
See application file for complete search history.

(56) References Cited

OTHER PUBLICATIONS

John C. Platt, Sequential Minimal Optimization: A Fast Algorithm for Training Support Vector Machines, 1998, Microsoft Research.*
Smola et al., Advances in Large Margin Classifiers, 2000, The MIT Press, pp. 21, 312, 315.*
Brown et al., Support Vector Machine Classification of Microarray Gene Expression Data, 1999, UCSC-CRL-99-09.*
Cortes, C., Vapnik, V.; "Support-Vector Networks"; Machine Learning, 20, 1995 pp. 273-297.
Dumais, S., Platt, J., Heckerman, D., Mehran, S.; "Inductive Learning Algorithms and Representations for Text Categorization"; Proceedings of the seventh International Conference on Information Knowledge Management 1998, pp. 148-155.

Joachims, T.; "Text Categorization with Support Vector Machines: Learning with Many Relevant Features" Technical Resport, University Dortmund, Dept of Artificial Intelligence, 1997, 18 pgs.
Joachims, T.; "Making Large-Scale SVM Learning Practical" Advances in Kernel Methods—Support Vector Learning, MIT Press, 1998, 17 pgs.
Littlestone, N., Warmuth, M.; "Relating Data Compression and Learnability" University of California at Santa Cruz, Jun. 1986, pp. 1-13.
Platt, J.; "Fast Training of Support Vector Machines using Sequential Minimal Optimization"; Advances in Kernel Methods—Support Vector Learning, MIT Press, 1998, pp. 185-208.
Shawe-Taylor, J., Barlett, P., Williamson, R.C., Anthony, M.; "Structural Risk Minimization over Data-Dependent Hierarchies"; IEEE Transactions on Information Theory, 44, 1998, pp. 1-33.
Rosenblatt, F.; "The Perceptron: A Probabilistic Model for Information Storage and Organization in the Brain"; Psychological Review, 65, 1958, pp. 92-114.
Herbrich, R.; Learing Kernel Classifiers: Theory and Algorithms MIT Press 2001, relevant excerpts pp. 8-11, 17-27, 323-324, 334-340.

* cited by examiner

*Primary Examiner*—Anthony Knight
*Assistant Examiner*—Nathan H. Brown, Jr.
(74) *Attorney, Agent, or Firm*—Microsoft Corporation (57) ABSTRACT

A modified large margin perceptron learning algorithm (LMPLA) uses asymmetric margin variables for relevant training documents (i.e., referred to as "positive examples") and non-relevant training documents (i.e., referred to as "negative examples") to accommodate biased training sets. In addition, positive examples are initialized to force at least one update to the initial weighting vector. A noise parameter is also introduced to force convergence of the algorithm.

16 Claims, 7 Drawing Sheets

LARGE MARGIN PERCEPTRONS FOR DOCUMENT CATEGORIZATION

TECHNICAL FIELD

The invention relates generally to document categorization, and more particularly to a large margin perceptron having asymmetric margins.

BACKGROUND OF THE INVENTION

Document categorization is the problem of ranking documents with respect to their relevancy to a given category. For example, email documents may be ranked with respect to their relevancy to a particular category in order to provide a user with a list of relevant emails sorted from the most relevant to the least relevant. Furthermore, the emails documents having a ranking score that exceeds a given threshold may be labeled as "relevant" to a given category. Therefore, the email documents categorized as "relevant" to the category may be automatically moved or copied to a specified folder without intervention by the user. In one approach, the available categories are derived from a training set of documents with predefined relevance tags.

The Large Margin Perceptron Learning Algorithm (LMPLA) is one such approach, which has been known since at least 1973. See R. Duda and P. Hart, "Pattern Classification and Scene Analysis", Wiley, 1973. An LMPLA is a simple algorithm for learning the parameterization of a linear classifier. That is, an LMPLA determines the weighting parameters for a linear classifier function $f(x)=\Sigma_i w_i x_i$ that computes the relevancy of the document. The weighting parameters are determined from a training set of documents having known relevancies.

Despite its simplicity, the LMPLA is faster and less resource intensive than many more sophisticated text classifiers in use today. However, prior LMPLAs do not perform well for significantly unbalanced datasets (i.e., where the number of relevant documents is orders of magnitude larger than the number of non-relevant documents or vice versa), which is common in many real world applications. In addition, prior LMPLAs do not converge for all training sets.

SUMMARY OF THE INVENTION

Embodiments of the present invention solve the discussed problems by providing a system and method for implementing a modified LMPLA in which asymmetric margin variables are used for relevant training documents (i.e., referred to as "positive examples") and non-relevant training documents (i.e., referred to as "negative examples"). In addition, positive examples are initialized, and a noise parameter is introduced to force convergence of the algorithm.

In implementations of the present invention, articles of manufacture are provided as computer program products. One embodiment of a computer program product provides a computer program storage medium readable by a computer system and encoding a computer program that computes a classification weighting vector from a training set of training documents. Another embodiment of a computer program product may be provided in a computer data signal embodied in a carrier wave by a computing system and encoding the computer program that computes a classification weighting vector from a training set of training documents. Methods and systems for computing a classification weighting vector from a training set of training documents are also provided.

These and various other features as well as other advantages, which characterize the present invention, will be apparent from a reading of the following detailed description and a review of the associated drawings.

DETAILED DESCRIPTION OF THE INVENTION

A modified large margin perceptron learning algorithm (LMPLA) is provided for text categorization. The modified LMPLA uses asymmetric margin variables for relevant training documents (i.e., referred to as "positive examples") and non-relevant training documents (i.e., referred to as "negative examples") to accommodate biased training sets. In addition, positive examples are initialized to force at least one update to the initial weighting vector. A noise parameter is also introduced to force convergence of the algorithm.

The problem of document categorization with classifiers can be defined as follows: Given a training set $S=\{(X_1, y_1), \ldots, (X_m, y_m)\}$ of m document objects having a known relevance status for a given topic (as indicated by their corresponding relevancy labels $y_i \in \{-1,+1\}$), a weighting vector W for a given topic or category exists such that further classifications of documents can be determined based on the value of the function $f_W(X)=\Sigma_j w_j x_j$ over the number of possible terms in the training set. The result $f_W(X)$ represents the confidence level of a classification (i.e., a ranking of relevance to the topic as compared to other documents), where X is a document vector for a new document being classified. The value $X_i$ is a vectorial representation of the $i^{th}$ document object. The value $y_i=+1$ indicates that the $i^{th}$ document is relevant to a given category, and the value $y_i=-1$ indicates that the $i^{th}$ document is not relevant to the category. The variable m represents the number of documents in the training set, and a variable n represents the total number of distinct terms (or a subset of these terms) found in the documents of the training set.

In one embodiment, an $i^{th}$ document is represented by a document vector $X_i$, e.g., as a normalized tf-idf (term frequency-inverse document frequency) vector. For each category, a weighting vector W may be computed from the m training set documents. For terms shown to correlate strongly with relevancy to a category, the weighting factor emphasizes the influence of the frequency of these terms in the relevancy function. In contrast, for terms shown to correlate weakly with relevancy to a category, the weighting factor de-emphasizes the influence of the frequency of these terms in the relevancy function.

In one embodiment, a document vector $X_i$ takes the form of a one dimensional matrix of length n, where the n elements of the matrix include the td-idf values associated with an indexed term between 1 and n in the training set. Each distinct term existing in the training set corresponds to an indexed element in the matrix.

Figure 1:
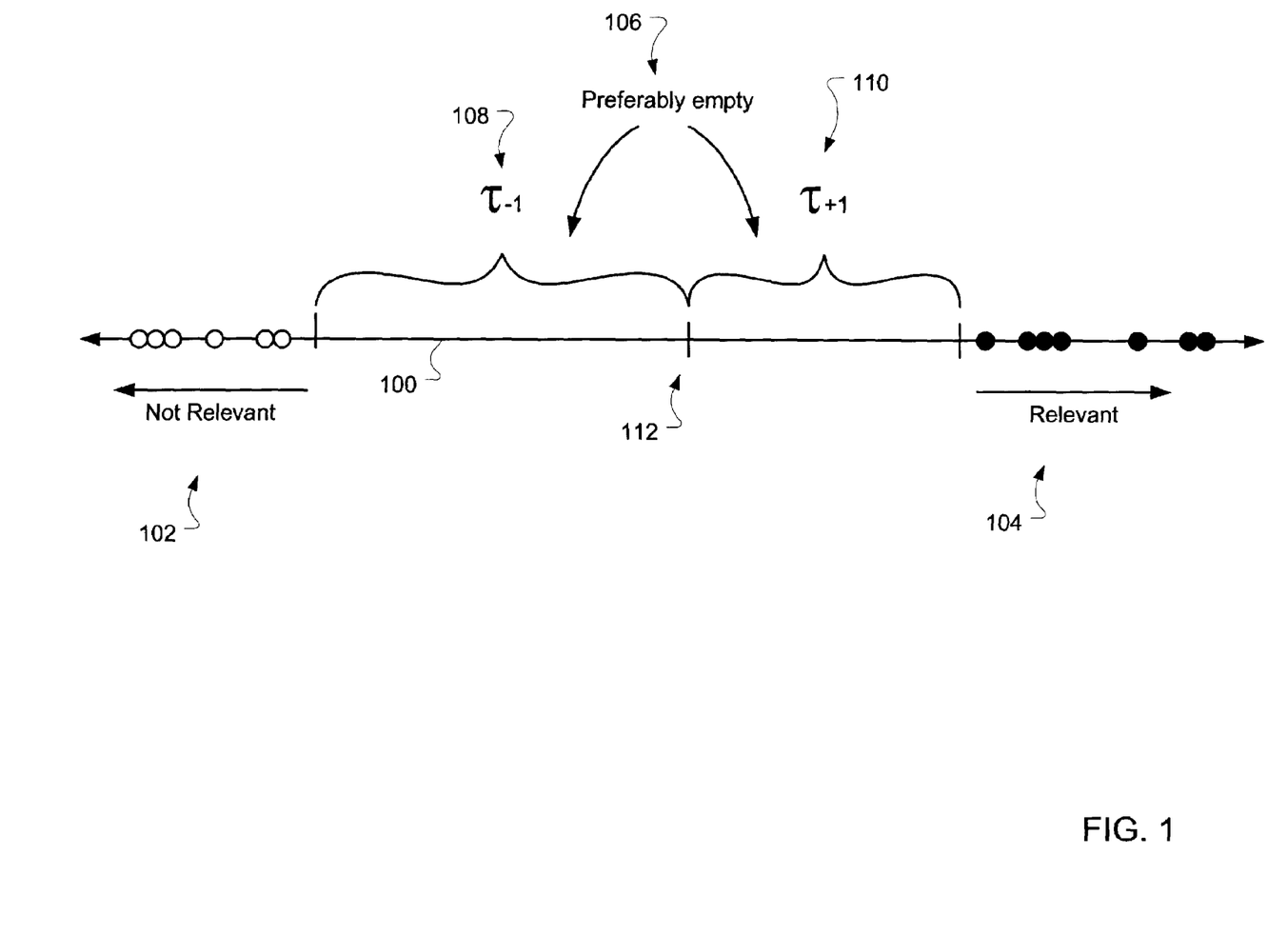
FIG. 1 conceptually illustrates selection of a weighting vector value in an embodiment of the present invention.

FIG. 1 conceptually illustrates considerations in optimizing a weighting vector value in an embodiment of the present invention. The axis 100 represents the continuum of possible weighting vector values $w_j$ for a given term in a training set. The "hollow" circles to the left of the axis 100 represent non-relevant documents 102, whereas the "filled" circles to the right of the axis 100 represent relevant documents 104. Ideally, the weighting vector value $w_j$ (e.g., represented at point 112 on the continuum) for each term is set to separate the non-relevant and relevant documents on the continuum. However, this separation is not absolute because the non-relevant and relevant documents may be interspersed along the continuum. As such, a weighting vector value for each term is calculated to optimize separation of non-relevant and relevant documents, despite the fact that perfect separation may be unattainable.

Therefore, the objective in generating a weighting vector is to determine the optimal weighting vector value for each term in the training set, such that $f_W(x)$ is maximized for relevant documents and minimized for non-relevant documents. To achieve this dual objective, particularly in training sets where the number of relevant documents and non-relevant documents is greatly skewed, two asymmetric margin values are designated to optimize the "separation" effect achieved by the weighting vector. As shown in FIG. 1, a $t_{+1}$ margin value 108 and a $t_{-1}$ margin value 110 are applied to the weighting vector value 112 during the computation of the weighting vector value 112. In the ideal of perfect separation, the region 106 defined by the margins on either side of the weighting vector value is empty, in that no documents are found within this region. However, as explained previously, less than ideal circumstances may result in documents being found within the region 106. Nonetheless, the goal is to optimize the region separating the non-relevant and relevant documents, despite possible overlaps along the continuum.

It should be understood that FIG. 1 illustrates an exemplary set of documents in which there is ideal separation of relevant and non-relevant documents in the vector space. However, both relevant and non-relevant documents may also be located within the margins in non-ideal conditions. In addition, non-relevant documents may be found to the right of the $t_{+1}$ margin and/or relevant documents may be found to the left of the $t_{-1}$ margin in non-ideal conditions without departing from the scope of the present invention.

An initial operation associated with an LMPLA is the development of document vectors X for a training set of documents. As previously discussed, a document vector comprises a vector of length n, where n is the number of terms in the training set. However, an alternative embodiment may employ an alternatively sized vector, such as a vector of length n+m, where m is the number of documents in the training set.

Figure 2:
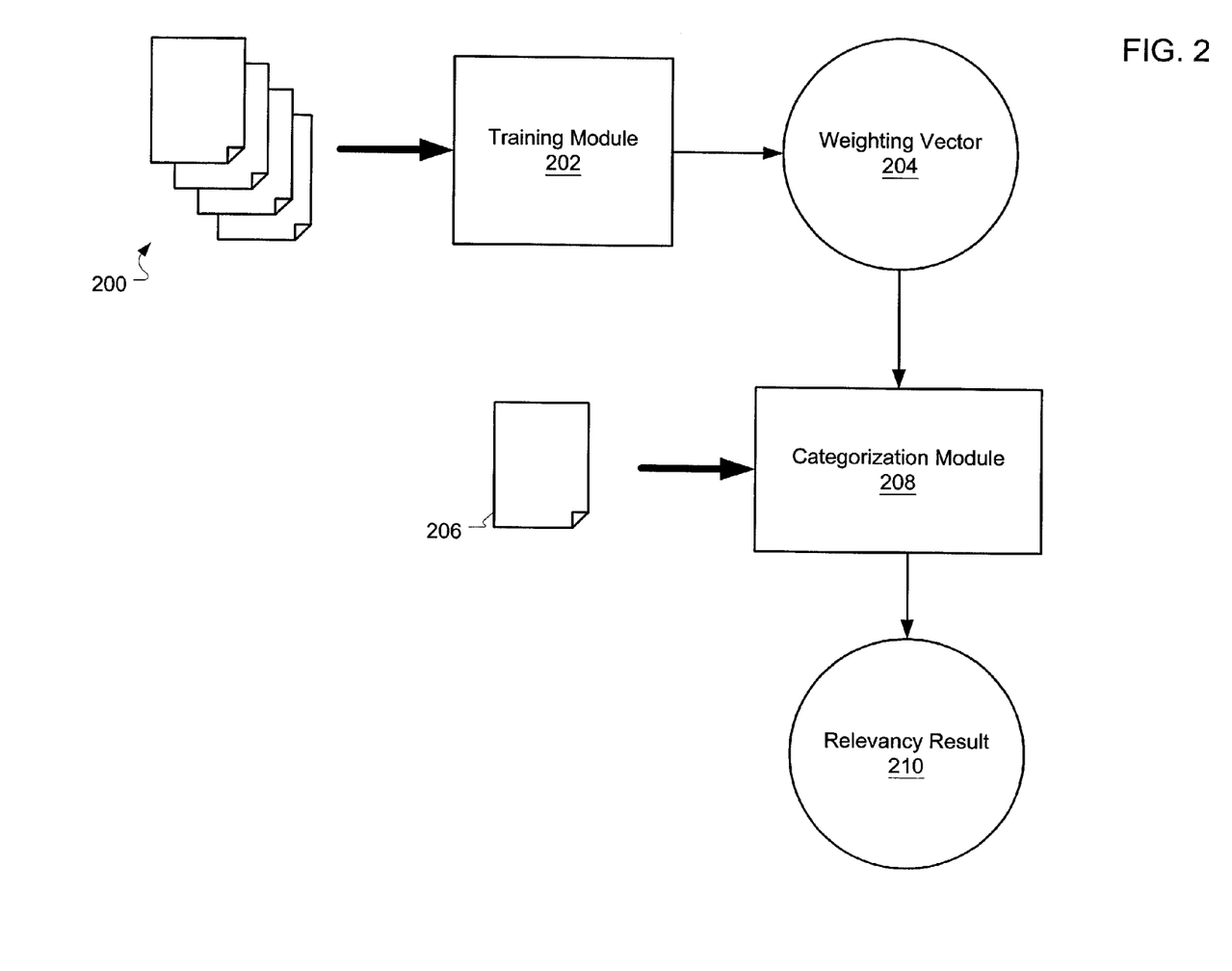
FIG. 2 illustrates elements of a system for text classification in an embodiment of the present invention.
Figure 3:
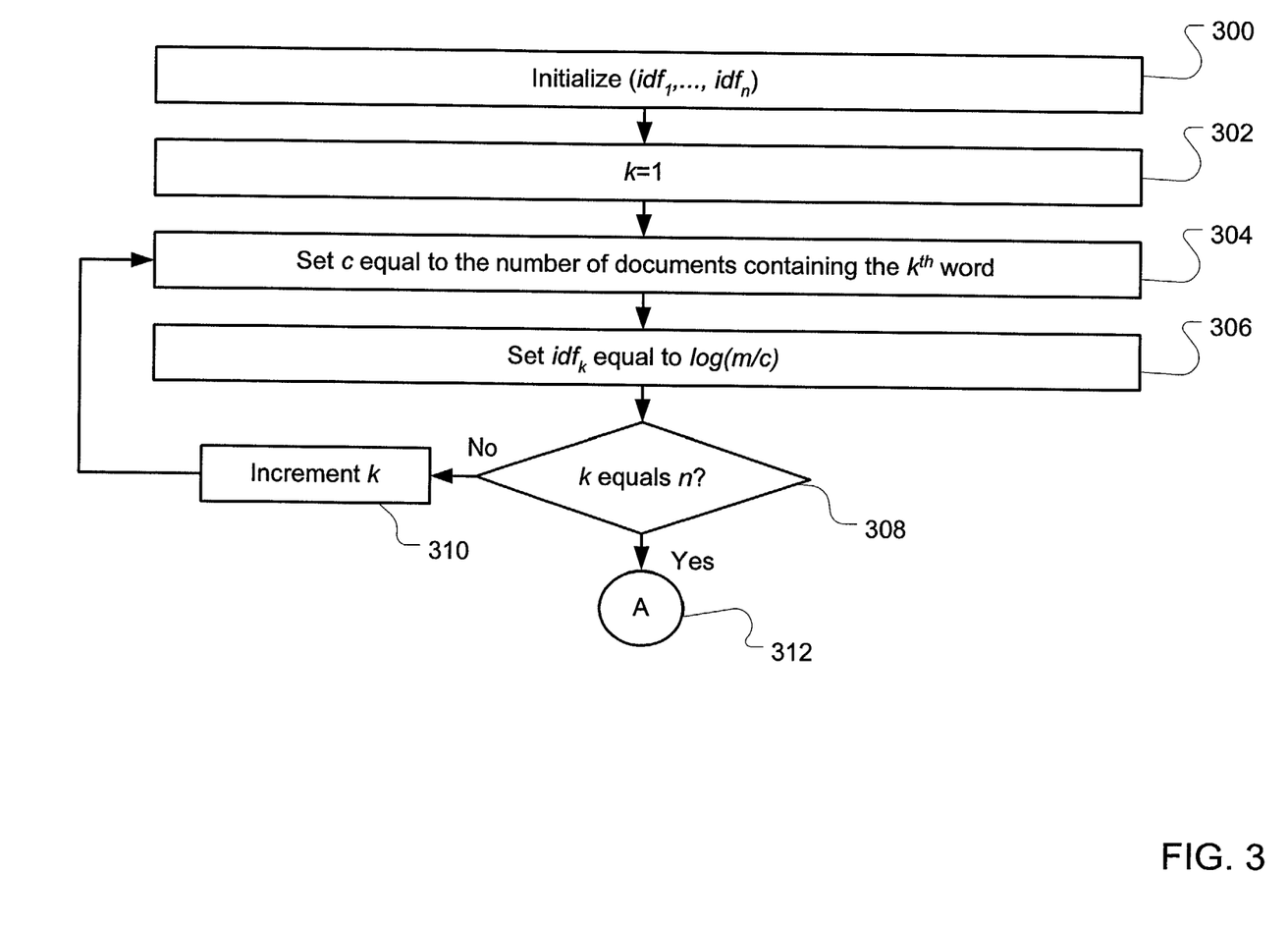
FIG. 3 illustrates operations for determining the Inverse Document Frequency (idf) of an $i^{th}$ document in an embodiment of the present invention.
Figure 4:
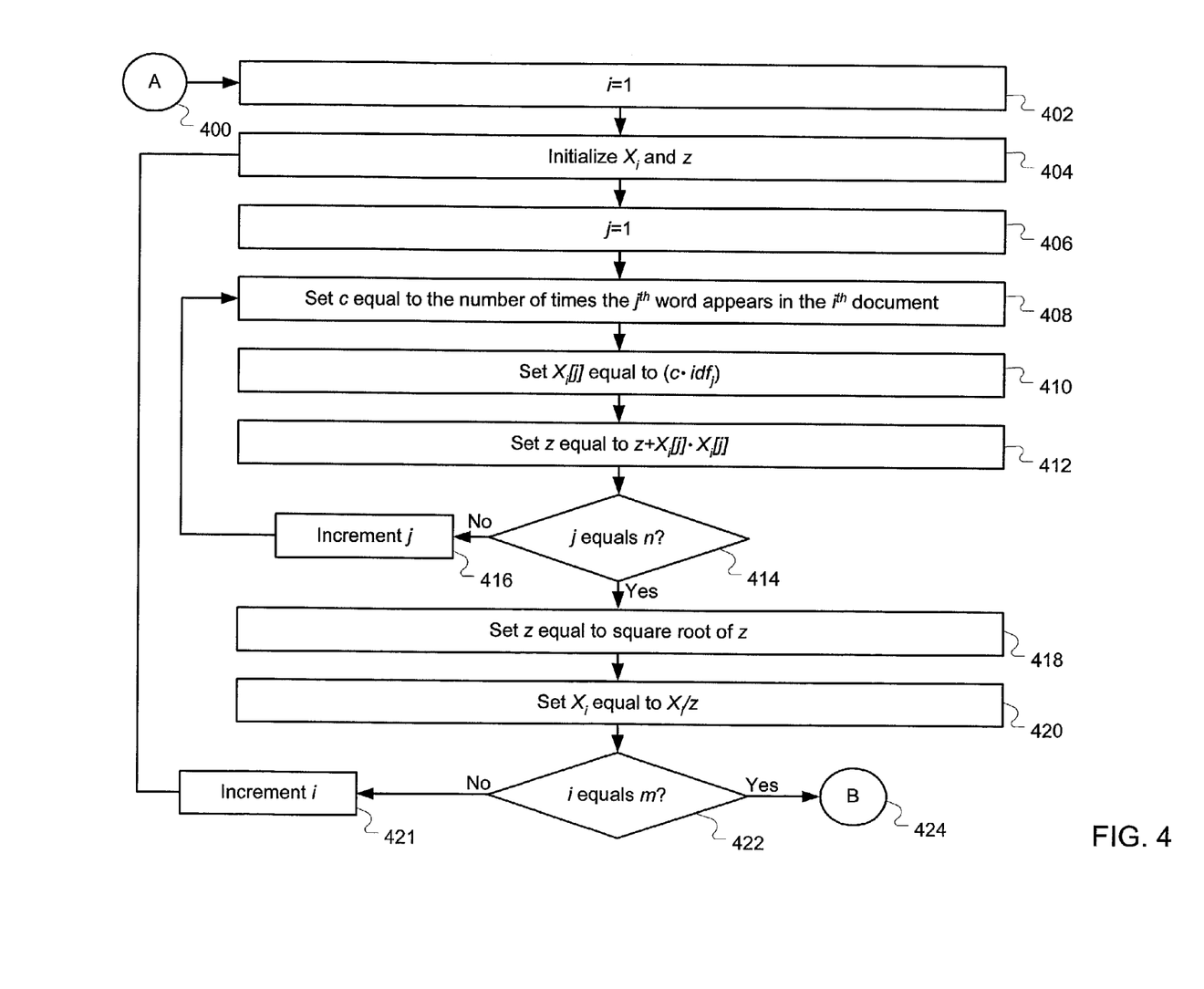
FIG. 4 illustrates operations for determining the m document vectors $X_i$ in an embodiment of the present invention.

FIG. 2 illustrates elements of a system for text classification in an embodiment of the present invention. A training set of documents 200 having known relevancy are input to a training module 202. The training module 202 includes a vectorizing sub-module (not shown) that generates vectorial representations of each training document (i.e., generating a document vector X for each training document). Detailed operations of the vectorizing process of an embodiment of the present invention are illustrated in FIGS. 3 and 4. The training module 202 also includes a weighting sub-module (not shown) that generates one or more weighting vectors 204 (i.e., W) from the training set vectors. Individual weighting vectors may be generated for each category of interest. As such, the document vectors may be input to the weighting sub-module numerous times to obtaining weighting vectors for multiple categories.

A categorization module 208 receives a document 206 (i.e., a classification document), which is to be classified as to whether it is relevant or not relevant to a given category. As such, the categorization module 208 inputs the weighting vector 204 for the specified category, generates a document vector X for the document 206 (such as by operation of a vectorizing sub-module (not shown)), and computes the result 210 of the relevancy function $f_W(X) = \Sigma_j w_j x_j$, wherein $w_j$ represents the $j^{th}$ element in the weighting vector associated with the specified category and $x_j$ represents the $j^{th}$ element in the document.

In one embodiment, a document vector $X_i$ may be generated from the $i^{th}$ document. In an initial stage of generating a document vector, certain preprocessing operations may be applied, although these are optional. Exemplary preprocessing operations are listed as follows: All characters in the $i^{th}$ document are made lower case, although in another embodiment, the characters could be made upper case or converted to some other standardized format. All non-alphanumeric characters are deleted. Terms that appear less than a given number of times (e.g., 3) are omitted from consideration. A "stemming" algorithm, such as the Porter stemmer, may be applied to reduce terms to their canonical or normalized form (e.g., to remove inflections, conjugations, plurals, etc.).

As described below, an idf value is determined for each term found in the training set documents, and then m document vectors $X_i$ (e.g., containing a tf-idf value for each element in the vector) are computed for the training set documents.

FIG. 3 illustrates operations for determining the Inverse Document Frequency (idf) of the $i^{th}$ document in an embodiment of the present invention. The idf operations are also described below in pseudocode, where n represents the number of different terms that exist in the m training set documents $(x_1, \ldots, x_m)$:

(1) Initialize n memory units to store $(idf_1, \ldots, idf_n)$ (e.g., set to 0)
(2) For k from 1 to n
(3)     Set c equal to the number of documents in which the $k^{th}$ word appears
(4)     Set $idf_k$ equal to $\log(m/c)$
(5) Next k As shown in FIG. 3, an initialization operation 300 initializes n memory locations to store n values of $(idf_1, \ldots, idf_n)$. In one embodiment, the memory units are initialized to zero, although other initialization values are contemplated within the scope of the present invention. A loop operation 302 initializes a loop on the index variable k to start at 1. A frequency operation 304 sets a temporary variable c equal to the number of documents containing the $k^{th}$ word in the training set. Determination to the number of such documents may be computed in a counting operation (not shown) or achieve by reading from a datastore containing such information. A setting operation 306 sets the $k^{th}$ value of idf (i.e., $idf_k$) equal to $\log(m/c)$.

If all of the terms 1 to n were processed in the loop, as determined by a decision block 308, processing proceed to the link A (see circle 312). Otherwise, k is incremented in an incrementing operation 310 and processing loops back to the setting operation 304. The loop generates idfs associated with each term in the training set. It should also be understood that the idf processing shown in FIG. 3 could also terminate when the loop completes without proceeding through the link A. The idf values could be recorded and retrieved at a later time to compute document vectors.

FIG. 4 illustrates operations for determining the m document vectors $X_i$ associated with the training set in an embodiment of the present invention. Tf-idf values are generated for each term element of each document vector. The tf-idf operations are also described below in pseudocode, where n represents the number of different terms that exist in the m training set documents $(x_1, \ldots, x_m)$:

```
(1)   For i from 1 to m
(2)       Initialize n memory units to store X_i (e.g., set equal to 0)
(3)       Initialize z (e.g., set equal to 0)
(4)       For j from 1 to n
(5)           Set c equal to the number of times the j^th word
              appears in the i^th document (i.e., x_i)
(6)           Set X_i[j] equal to (c · idf_j)
(7)           Set z equal to z + X_i[j] · X_i[j]
(8)       Next j
(9)       Set z equal to the square root of z
(10)      Set X_i equal to X_i/z
(11)  Next i
```

As shown in FIG. 4, processing proceeds through the link A (see circle 400) to a loop operation 402, which initializes the loop index i equal to 1. An initialization operation 404 initializes memory units storing n document vectors $X_i$ and a temporary variable z. In one embodiment, the memory units are initialized to zero, although other initialization values are contemplated within the scope of the present invention.

A second loop operation 406 initializes the loop index j equal to 1. Within the j loop, a setting operation 408 sets a temporary variable c to the number of times the $j^{th}$ word appears in the $i^{th}$ document. Another setting operation 410 sets the $j^{th}$ element of document vector $X_i$ equal to (c·$idf_j$). A third setting operation 412 sets the temporary variable z equal to z+$X_i[j]$·$X_i[j]$, where $X_i[j]$ represents the $j^{th}$ element of document vector $X_i$. If a decision operation 414 then determines that the internal loop (i.e., the j loop) has not yet iterated from 1 to n, then processing proceeds to an incrementing operation 416, which increments j and proceeds to operation 408.

Otherwise, a setting operation 418 sets z equal to the square root of z and a normalizing operation 420 sets the document vector $X_i$ equal to $X_i/z$. If a decision operation 422 then determines that the external loop (i.e., the i loop) has not yet iterated from 1 to m, then processing proceeds to an incrementing operation 421, which increments i and proceeds to operation 404. Otherwise, processing proceeds through the link B (see circle 424). By the completion of the external loop, m training document vectors $X_1$ to $X_m$ have been generated for use in computing one or more weighting vectors. It should also be understood that the tf-idf processing shown in FIG. 4 could also terminate when the loop completes without proceeding through the link B. The tf-idf values could be recorded and retrieved at a later time to compute document vectors.

Figure 5:
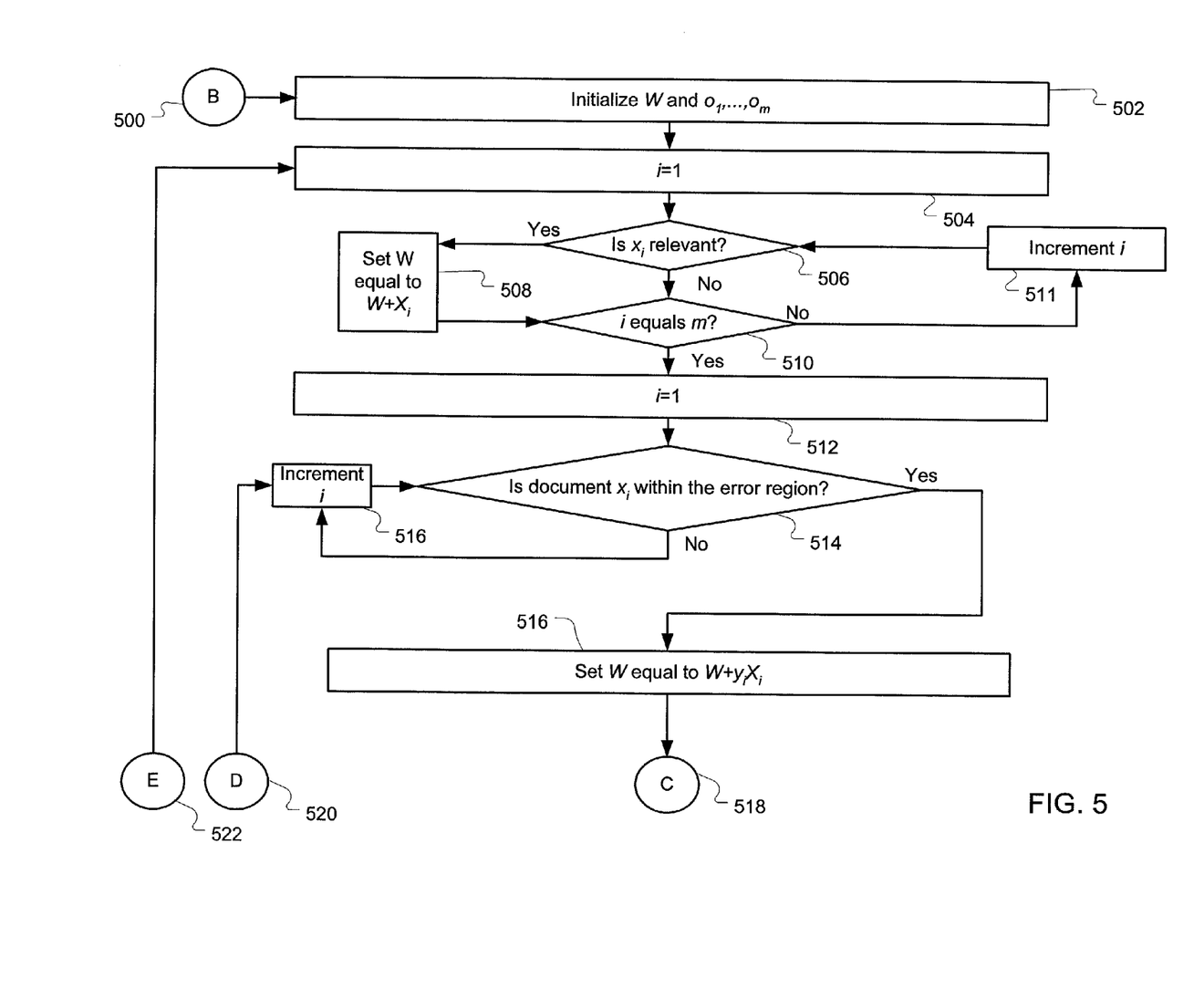
FIGS. 5 and 6 illustrate operations for determining the weighting vector W in an embodiment of the present invention.
Figure 6:
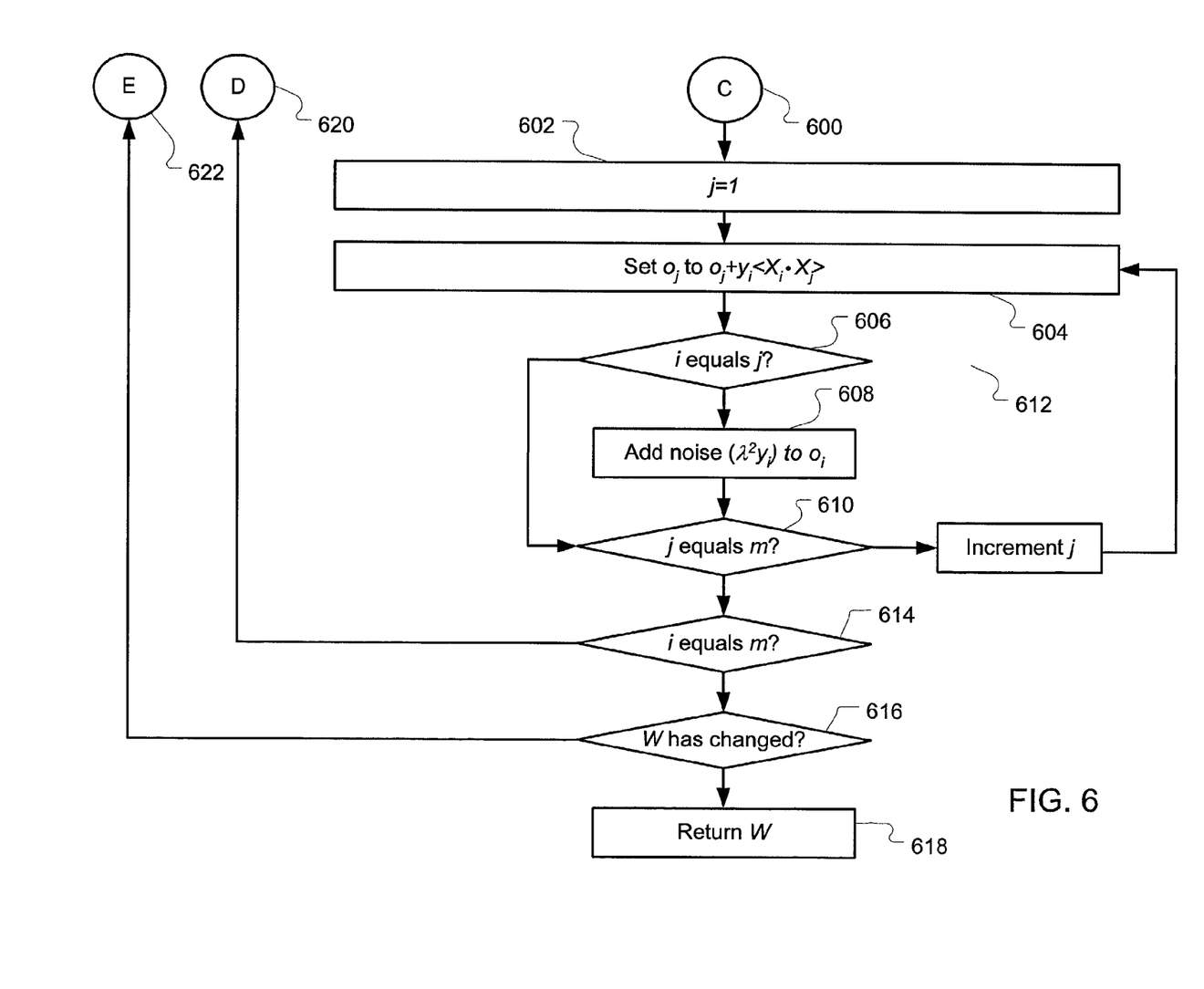

FIGS. 5 and 6 illustrate operations for determining the weighting vector W in an embodiment of the present invention. The weighting vector computation operations are also described below in pseudocode, where n represents the number of different terms that exist in the m training set documents $(x_1, \ldots, x_m)$:

```
(1)   Initialize n memory units to store W(e.g., set equal to 0)
(2)   Initialize m memory units to store O (e.g., set equal to 0)
(3)   For i from 1 to m
(4)       If (y_i = +1) then
(5)           Set W equal to W + X_i
(6)       Endif
(7)   End For
(8)   Repeat
(9)       For i from 1 to m
(10)          If (y_i = +1 and o_i ≦ t_{+1}) or (y_i = −1 and −o_i ≦ t_{−1}) then
(11)              Set W equal to W + y_i X_i
(12)              For j from 1 to m
(13)                  Set o_j equal to o_j + y_i(X_i · X_j)
(14)                  If (i equals j) then
(15)                      Set o_j to o_j + λ^2 y_i
(16)                  End If
(17)              Next j
(18)          End If
(19)      Next i
(20)  Until W has not changed in the loop over i
(21)  Return W
```

As shown in FIG. 5, processing proceeds through the link B (see circle 500) to an initialization operation 502 that initializes memory units storing a weighting vector W having a length n and memory units storing m perturbed inner products $o_1$ to $o_m$. In one embodiment, the memory units are initialized to zero, although other initialization values are contemplated within the scope of the present invention.

A loop operation 504 initializes the loop index i equal to 1. A decision operation 506 determines whether the $i^{th}$ training document is relevant (e.g., on the basis of the relevancy value $y_i$). If so, the document vector $X_i$ is added to the weighting vector W in a setting operation 508 as part of a weighting initialization stage that forces at least one weighting vector update (see pseudocode line 11 above). After the setting operation 508 or if the $i^{th}$ document was determined to be non-relevant, a decision operation 510 determines whether all of the documents have been iterated through in the initialization stage. If not, an incrementing operation 511 increments i and processing proceeds to the decision operation 506.

After the initialization stage completes, a loop operation 512 initializes i equal to 1. A decision operation 514 determines whether an $i^{th}$ document is represented within the error region defined by the two margins $t_{+1}$ and $t_{−1}$. In one embodiment, a perturbed inner product (represented by o) is tested against each of the margin values. If either of the conditions shown in the pseudocode line 10 above is true, an update of the weighting vector W is performed by proceeding to the update operation 516. The update pushes the weighting vector closer to the error document vector mirrored according to its category $y_i$. Otherwise, i is merely incremented in incrementing operation 516 and the next document is tested in the decision operation 514. After the updating operation 516, processing proceeds through link C (see circle 518) to introduce a perturbation to the inner product o.

Turning to FIG. 6, processing proceeds through the link C (see circle 600) to a loop operation 602, which initializes the loop index j equal to 1. A setting operation 604 sets $o_j$ equal to $o_j+y_i(X_i·X_j)$, wherein $(X_i·X_j)$ is shorthand notation for the inner product $\Sigma_j X_i[j] X_j[j]$ over j=1 to m. In addition, if i equals j in decision operation 606, a perturbation is applied in the perturbation operation 608 to the perturbed inner product $o_i$ in the form of $\lambda^2 y_i$, wherein $\lambda$ is a noise parameter. The perturbation forces the algorithm to converge if $\lambda > 0$.

If the decision operation 610 determines that the j loop is complete (e.g., j equals m). If not, an incrementing operation 612 increments j and processing returns to the setting operation 604. Otherwise, a decision operation 614 test whether the i loop is complete (e.g., i equals m). If not, processing proceeds through link D (see circle 620 in FIG. 6 and circle 520 in FIG. 5) to the incrementing operation 516.

However, if the i loop is complete, a decision operation 616 determines whether the weighting vector W has changed during the current iteration. If not, a return operation 618 returns the weighting vector W for use in categorizing documents for a given category. On the other hand, if W changed during the current iteration, processing proceeds through link E (see circle 622 in FIG. 6 and circle 522 in FIG. 5) to the loop operation 504 to re-compute W based on the current states of W and $o_1$ to $o_m$.

Having generated a weighting vector W using the training documents, any additional new documents may be ranked with respect to the classifier function $f_W(X) = \Sigma_j w_j x_j$. Alternatively, a threshold may be set on the classifier function to classify the most relevant documents. A document vector X is generated for the document x, as illustrated in FIGS. 3 and 4.

Figure 7:
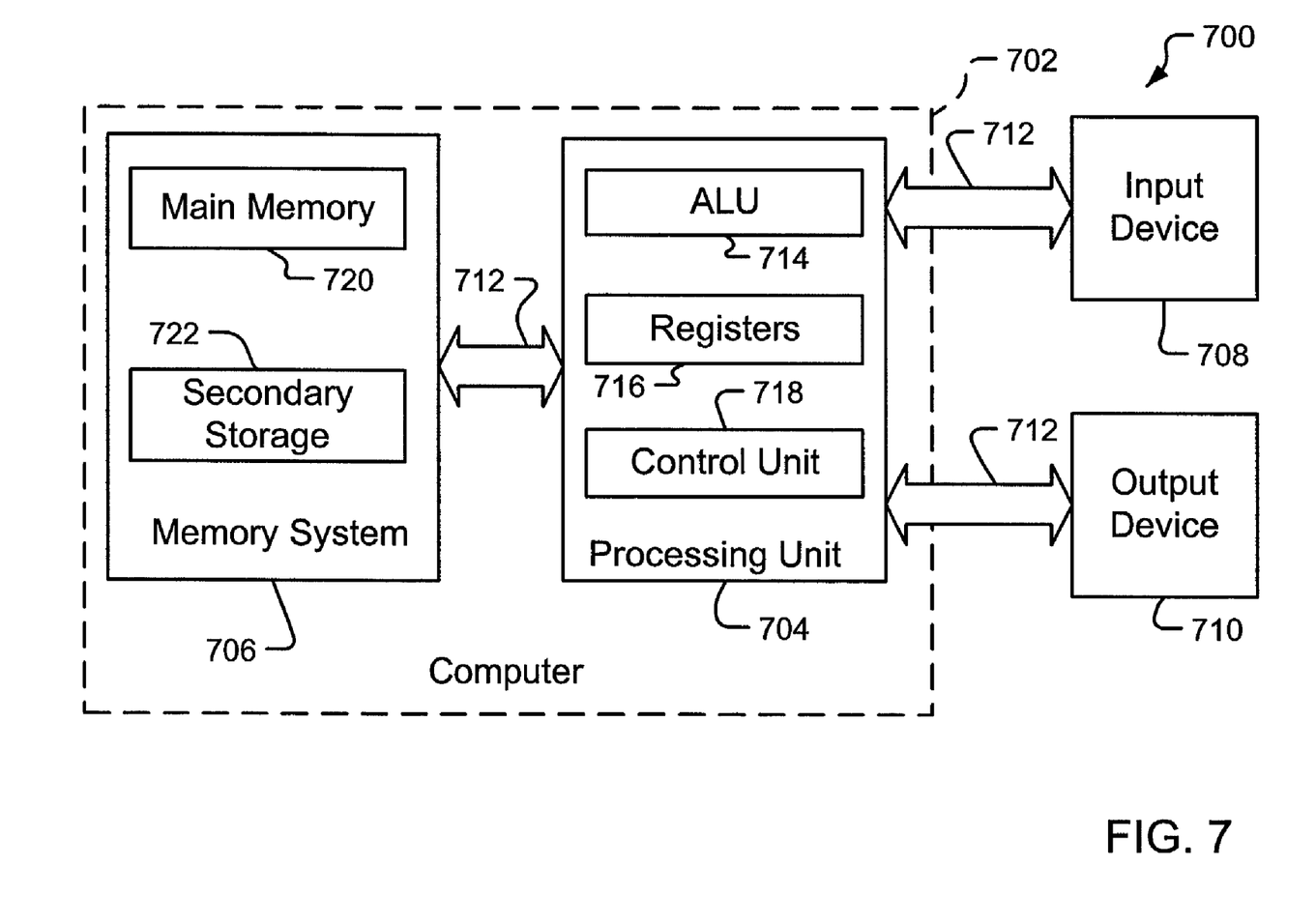
FIG. 7 illustrates an exemplary system useful for implementing an embodiment of the present invention.

The exemplary hardware and operating environment of FIG. 7 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, software of the present invention, including the training module and the classifier, may be incorporated as part of the operating system 35, application programs 36, or other program modules 37. The training documents, document vectors, weighting vectors and relevancy results may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. One or more computer-readable media having executable instructions stored thereon that, when executed, implement a method comprising:
   receiving a plurality of training documents;
   for each training document:
      determining if the training document is a relevant document or a non-relevant document;
      if the training document is a relevant training document, determining whether the relevant training document introduces an error within a first margin relative to an inner product associated with the relevant training document;
      if the training document is a non-relevant training document,
   determining whether the non-relevant training document introduces an error within a second margin relative to an inner product associated with the non-relevant training document;
      updating a classification weighting vector based on a document vector of the training document, if the training document introduces an error; and
      storing the updated classification weighting vector.

2. The one or more computer-readable media as recited in claim 1 wherein the first margin and the second margin are unequal.

3. The one or more computer-readable media as recited in claim 1 further comprising initializing the classification weighting vector based on one or more document vectors of relevant training documents from the plurality of training documents.

4. The one or more computer-readable media as recited in claim 1 further comprising introducing a noise parameter into the inner product.

5. A method comprising:
   receiving a set of training documents;
   if a training document is a relevant training document and the training document introduces an error within a first margin relative to an inner product associated with the training document, updating a classification weighting vector based on a document vector of the training document;
   if a training document is a non-relevant training document and the training document introduces an error within a second margin relative to an inner product associated with the training document, updating the classification weighting vector based on a document vector of the training document; and
   storing the updated classification weighting vector.

6. The method of claim 5 wherein the first margin and the second margin are unequal.

7. The method of claim 5 further comprising:
   initializing the classification weighting vector based on one or more document vectors of relevant training documents from the training set.

8. The method of claim 5 further comprising:
   introducing a noise parameter into the inner product.

9. A classification system for computing a classification weighting vector associated with a given category from a training set of training documents, the system comprising:
   a training module generating document vectors from the training set and generating the classification weighting vector based at least two asymmetric margins; and
   wherein the at least two asymmetric margins further comprise a first margin that is applied to relevant training documents and a second margin that is applied to non-relevant training documents.

10. The classification system of claim 9 further comprising:
    a categorization module classifying an input document based on the classification weighting vector and a document vector of the input document.

11. One or more computer-readable media having executable instructions stored thereon that, when executed, implement a method comprising:
    initializing a classification weighting vector based on one or more document vectors of relevant training documents;
    determining whether a relevant training document introduces an error within a first margin relative to a perturbed inner product associated with the relevant training document;
    determining whether a non-relevant training document introduces an error within a second margin relative to a perturbed inner product associated with the non-relevant training document; and
    for each training document that introduces an error, updating the classification weighting vector based on a document vector of the training document.

12. The one or more computer-readable media as recited in claim 11, further comprising: introducing a noise parameter into the perturbed inner product.

13. A method comprising:
    receiving a set of training documents;
    initializing a classification weighting vector based on one or more document vectors of relevant training documents from the training set;
    for each training document in the training set:
       determining if the training document is a relevant training document or a non-relevant training document;
       if the training document is a relevant training document, determining whether the relevant training document introduces an error within a first margin relative to a perturbed inner product associated with the relevant training document;
       if the training document is a non-relevant training document, determining whether the non-relevant training document introduces an error within a second margin relative to a perturbed inner product associated with the non-relevant training document; and
       if the training document introduces an error relative to the first or second margin, updating the classification weighting vector based on a document vector of the training document.

14. The method of claim 13 further comprising:
    introducing a noise parameter into the perturbed inner product.

15. A classification system for computing a classification weighting vector associated with a given category from a training set of training documents, the system comprising:

a training module configured to:
  initialize the classification weighting vector based on one or more document vectors of relevant training documents from the training set;
  for each training document:
    determine, if the training document introduces an error within a margin relative to a perturbed inner product associated with the training document;
    updating the classification weighting vector based on a document vector of the training document if the training document introduces an error within the margin; and
  wherein the margin is a first margin if the training document is a relevant training document, the margin is a second margin if the training document is a non-relevant training document, and the first margin is not equal to the second margin.

16. The classification system of claim 15 further comprising:
  a categorization module configured to classify an input training document based on the classification weighting vector and a document vector of the input training document.

* * * * *